3,240,761
CATIONIC THERMOSETTING QUATERNIZED
POLYAMIDE - EPICHLOROHYDRIN RESINS
AND METHOD OF PREPARING SAME
Gerald I. Keim, West Grove, Pa., and Alfred C. Schmalz,
Covington, Va., assignors to Hercules Powder Company, Wilmington, Del., a corporation of Delaware
No Drawing. Filed July 10, 1962, Ser. No. 211,928
7 Claims. (Cl. 260—78)

This application is a continuation-in-part of application Serial No. 750,073, filed July 22, 1958, now abandoned.

This invention relates to stable solutions of cationic thermosetting polyamide-epichlorohydrin resins and to a method of preparing same.

It has been found that certain cationic thermosetting resins formed by condensing a polyamide of a polyalkylene polyamine and a $C_3$-$C_{10}$ saturated aliphatic dicarboxylic acid with epichlorohydrin are very efficient wet-strength resins for paper. These resins have been stabilized by pH adjustment to the acid side as by the addition of an acid.

It has now been discovered that aqueous solutions of water-soluble cationic thermosetting polyamide-epichlorohydrin resins of the indicated type can be stabilized by incorporating into the resin formulation appropriate amounts of an agent capable of quaternizing tertiary nitrogen atoms formed by reaction of the epichlorohydrin with secondary amino groups of the polyamide. The resulting resins are stable for relatively long periods of time at total solids of 25% and higher. Moreover, they appear to retain all of the desirable features of previously known resins of this type with no significant loss in wet-strength efficiency.

The novel cationic thermosetting resins of the invention may be generally described as water-soluble polymeric condensation products formed by reacting epichlorohydrin and a quaternizing agent with certain polyamides under conditions hereinafter described.

The polyamides which are utilized in preparing these cationic resins are obtained by reacting a saturated aliphatic dicarboxylic acid containing from 3–10 carbon atoms with a polyalkylene polyamine, preferably in aqueous solution, under conditions such as to produce a water-soluble polyamide containing the recurring groups —NH($C_nH_{2m}$HN)$_x$—CORCO— where $n$ and $x$ are each 2 or more and R is the divalent hydrocarbon radical of the dicarboxylic acid. Typical acids suitable for use herein are malonic, succinic, adipic, azelaic and diglycolic. The saturated dicarboxylic acids having from 4 to 8 carbon atoms in the molecule are preferred. Blends of two or more of the saturated dicarboxylic acids may also be used.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention may be represented as polyamines in which the nitrogen atoms are linked together by groups of the formula —$C_nH_{2n}$— where $n$ is a small integer greater than unity and the number of such groups in the molecule ranges from two up to about eight, and preferably up to about four. The nitrogen atoms may be attached to adjacent carbon atoms in the group —$C_nH_{2n}$— or to carbon atoms further apart, but not to the same carbon atom.

This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups. The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine, or a heterocyclic diamine such as piperazine or the like for a portion of the polyalkylene polyamine. For this purpose, up to about 60% of the polyalkylene polyamine may be replaced by a molecularly equivalent amount of the diamine. Usually a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times, e.g., up to about 4 hours, may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1, and preferably from about 0.92:1 to 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel, while mole ratios above 1.4:1 result in low molecular weight polyamides.

The polyamide, formed as above described, is converted to a cationic thermosetting resin of improved stability by reacting same with epichlorohydrin and a quaternizing agent. The polyamide, in aqueous solution, is reacted at a temperature within the range from about 45° C. to about 100° C., first partially with epichlorohydrin until at least about 25% of the secondary amine groups in said polyamide have reacted with epichlorohydrin and then with epichlorohydrin and a quaternizing agent capable of quaternizing tertiary nitrogen atoms formed during the reaction. In a preferred procedure, the epichlorohydrin is first added to an aqueous solution of the polyamide at a temperature from about 45° to 55° C. The reaction mixture is then heated at a temperature from about 50° to 100° C. and preferably from about 60° to 80° C. depending upon the rate of polymerization desired. After a suitable time at this temperature, i.e., from about 0–100 minutes, and preferably until the viscosity of an approximately 25% solids solution of the reaction mixture at 25° C. is from about <A to <B on the Gardner-Holdt scale, at which time most of the epoxy groups of the epichlorohydrin have reacted with the secondary amine groups of the polyamide, the quaternizing agent is added and the reaction mixture heated, preferably at a temperature from about 60° C. to about 80° C., until the viscosity of an approximately 25% solids solution at 25° C. is at least A and preferably at least B to C on the Gardner-Holdt scale. The solids-viscosity relationship may be obtained by (1) direct polymerization at the 25% level, (2) polymerization at a higher level followed by dilution to 25% solids, or (3) polymerization at a lower level followed by concentration at less than 40° C. and under reduced pressure to 25% solids. The pH of the reaction mixture is then reduced to about 4.0 and preferably to about 2.0 to 3.0 with any suitable acid such as sulfuric, hydrochloric, formic, and the like. The initial degree of polymerization, quantity of quaternizing agent and the final pH are all important in controlling the stability of the resins.

It is preferred to use sufficient epichlorohydrin to convert all secondary amine groups to tertiary amine groups although more or less may be used to moderate or increase reaction rates. In general, the amount of epichlorohydrin may vary from about 0.5 mole to about 1.8 moles for each secondary amine group of the polyamide. It is preferred to utilize from about 1.0 mole to about 1.5 moles of epichlorohydrin for each secondary amine group of the polyamide.

The amount of quaternizing agent utilized should be sufficient to convert from about 25% to about 75%, and preferably about 50%, of the tertiary amine groups to quaternary groups.

The quaternizing agent may be any compound capable of quaternizing a tertiary nitrogen in an aqueous medium. In general, these compounds are characterized by having as a principal part of their structure an alkyl group or substituted alkyl group which is readily available for alkylation under the conditions herein described. These include the lower alkyl esters of mineral acids such as the halides, sulfates, and phosphates, substituted alkyl halides and so on. Illustrative of the compounds which may be used are dimethyl, diethyl and dipropyl sulfate, methyl chloride, methyl iodide, methyl bromide, ethyl bromide, propyl bromide, the mono-, di- or tri-methyl, ethyl and propyl phosphates, 1,3-dichloropropanol-2, 1-chloroglycerol and so on. Certain aromatic compounds may also be used. Typical of these are benzyl chloride and methyl p-toluene sulfonate.

The following examples will illustrate the invention.

EXAMPLE 1

Into a 1-liter, 3-necked round-bottom flask fitted with mechanical stirrer, thermometer and distilling condenser was placed 200 g. (1.94 moles) of diethylenetriamine and 100 g. of water. The flask was flushed with nitrogen and kept under a nitrogen blanket throughout the reaction. To the well-stirred mixture was added, in 6 approximately equal portions, 290 g. (2.00 moles) of adipic acid. After the acid had dissolved in the amine, the solution was heated to 190±5° C. and held there for 1.5 hours. The reaction mixture was then cooled to 140° C. and diluted with 430.0 g. of water. The polyamide solution contained 54.6% solids and had an intrinsic viscosity (2% solution in 1 N ammonium chloride) of 0.116.

To 116 g. (63 g. dry basis) of this polyamide solution in a round-bottom flask equipped with mechanical stirrer and thermometer was added 210 g. of water. The solution was heated with stirring to 50° C. and 25.0 g. of epichlorohydrin was added during a period of 2 minutes. The solution was heated to 70° C. and, after 10 minutes at this temperature, 17.0 g. of dimethyl sulfate was added dropwise over a period of 7 minutes. The solution was heated with stirring at 70° C. until a Gardner viscosity of <C was attained (4 hours 16 minutes). It was then cooled to 25° C. and adjusted to pH 4.0 with 3.1 ml. of 10% sulfuric acid. The product contained 27.0% solids and had a Gardner viscosity of >B at 25° C. (Brookfield viscosity 51.2 cps. at 25° C.). The product was stable to storage at 25±2° C. for at least 75 days. It was evaluated in paper as follows:

Tacoma bleached kraft pulp was beaten to a Schopper-Riegler freeness of 750 cc. in a Noble and Wood cycle beater. The pH of the pulp was 7.5–7.8. To this pulp was added 1.0% of the polyamide-epichlorohydrin-dimethyl sulfate resin based on the dry weight of the pulp. The pulp was sheeted on a Noble and Wood handsheet machine using a closed system. The white water contained 200 p.p.m. sulfate ion and had been adjusted to pH 7.5 with sodium bicarbonate solution. The resulting handsheets were run through press rolls and then drum dried according to the usual procedure. Portions of the resulting handsheets were cured for 1 hour at 105° C. The sheets tested for wet strength were soaked for 2 hours in distilled water. Results are listed in Table 1.

EXAMPLE 2

A polyamide prepared according to the procedure outlined in Example 1 was converted to a useful wet-strength resin as follows:

To a solution of 63.0 g. (dry basis) of the polyamide in 185.0 g. of water heated to 50° C. was added with stirring 31.0 g. of epichlorohydrin over a period of 3 minutes. The temperature of the solution was then raised to 70° C. After 10 minutes at 70° C., 17.0 g. of dimethyl sulfate was added during a period of 5 minutes. The mixture was heated with stirring at 70° C. until its viscosity at 25° C. reached <E on the Gardner scale (3 hours and 38 minutes). It was then diluted with 195.0 g. of water and held at 70° C. until its viscosity at 25° C. reached C on the Gardner scale (5 hours and 42 minutes). The solution was cooled to 25° C., adjusted to pH 4.0 with 0.8 ml. of 10% sulfuric acid and concentrated by heating at 25° C. to 40° C. at reduced pressure. The product contained 30.9% solids and had a Gardner viscosity of <J at 25° C. The product was stable to storage at 25±2° C. for at least 35 days. It was evaluated in paper as described in Example 1. Results are listed in Table 1.

EXAMPLE 3

A polyamide prepared according to the procedure outlined in Example 1 was converted to a useful wet-strength resin for paper as follows:

To a solution of 63.0 g. (dry basis) of the polyamide in 210.0 g. of water heated to 50° C. was added with stirring 31.0 g. of epichlorohydrin over a period of 3 minutes. The temperature of the solution was raised to 70° C. After 23 minutes at 70° C., 17.0 g. of dimethyl sulfate was added during a period of 5 minutes. The solution was heated with stirring at 70° C. until its viscosity at 25° C. reached >C on the Gardner scale (36 minutes). It was cooled to 25° C. and adjusted to pH 4.0 with 7.5 ml. of 10% sulfuric acid. The product contained 26.6% solids and had a Gardner viscosity of >D at 25° C. The product was stable to storage at 25±2° C. for at least 30 days. It was evaluated in paper as described in Example 1. Results are listed in Table 1.

EXAMPLE 4

A polyamide prepared according to the procedure outlined in Example 1 was converted to a useful wet-strength resin for paper as follows:

To a solution of 189.0 g. (dry basis) of the polyamide in 630.0 g. of water heated to 50° C. was added with stirring 75.0 g. of epichlorohydrin over a period of 6 minutes. The temperature of the solution was raised to 70° C. and 51.0 g. of dimethyl sulfate was immediately added over a period of 6 minutes. The solution was heated with stirring at 70° C. until its viscosity at 25° C. on the Gardner scale reached <C (4 hours and 59 minutes). It was cooled to 25° C. and adjusted to pH 4.0 with 7.0 ml. of 10% sulfuric acid. The product contained 25.8% solids and had a Gardner viscosity of <C at 25° C. The product was stable to storage at 25±2° C. for at least 85 days. It was evaluated in paper as described in Example 1. The results are listed in Table 1.

EXAMPLE 5

A polyamide prepared according to the procedure outlined in Example 1 was converted to a useful wet-strength resin for paper as follows:

To a solution of 63.0 g. (dry basis) of the polyamide in 100.0 g. of water heated to 50° C. was added with stirring 34.0 g. of epichlorohydrin over a period of 2 minutes. The temperature of the solution was raised to 70° C. and 17.0 g. of dimethyl sulfate was immediately added over a period of 2 minutes. The solution was heated with stirring at 70° C. until its viscosity at 25° C. reached <D on the Gardner scale (1 hour and 12 minutes). It was diluted with 140 g. of water, cooled to 25° C. and adjusted to pH 4.0 with 7.0 ml. of 10% sulfuric acid. The product contained 20.1% solids and had a Gardner viscosity of <A at 25° C. The product was stable to storage at 25±2° C. for at least 85 days. It was evaluated in paper as described in Example 1. The results are listed in Table 1.

EXAMPLE 6

A polyamide prepared according to the procedure outlined in Example 1 was converted to a useful wet-strength resin for paper as follows:

To a solution of 31.5 g. (dry basis) of the polyamide in 110 g. of water heated to 50° C. was added with stirring 18.2 g. of epichlorohydrin over a period of 3 minutes. The temperature of the solution was raised to 70° C. and held at this level until the viscosity of the solution reached <D at 25° C. on the Gardner scale (35 minutes). To the solution was added all at once 8.5 g. of dimethyl sulfate. It was then cooled to 25° C. and adjusted to pH 4.0 with 7.0 ml. of 4% hydrochloric acid. The product contained 25.8% solids and had a Gardner viscosity of >B at 25° C. The product was stable to storage at 25±2° C. for at least 90 days. It was evaluated in paper as described in Example 1. The results are listed in Table 1.

EXAMPLES 7 AND 8

Cationic polyamide-epichlorohydrin resins were prepared following essentially the procedures of Examples 2 and 6 except that the dimethyl sulfate was omitted from the formulations. These resins, which were unstable at solids concentrations of 30.9% and 25.8%, respectively, were evaluated in paper as described in Example 1. The results are listed in Table 1.

*Table 1* [1]

| Example No. | Percent Resin Added (Dry Pulp Basis) | Wet Tensile (lb./inch width) | |
|---|---|---|---|
| | | Uncured | Cured |
| 1 | 1.0 | 6.4 | 8.8 |
| 2 | 1.0 | 6.4 | 11.2 |
| 3 | 1.0 | 6.5 | 11.5 |
| 4 | 1.0 | 6.5 | 8.7 |
| 5 | 1.0 | 5.7 | 9.1 |
| 6 | 1.0 | 5.1 | 9.3 |
| 7 | 1.0 | 6.8 | 11.5 |
| 8 | 1.0 | 4.7 | 9.7 |

[1] Basis weight of all sheets was 40.0±0.5 lb. per 3,000 sq. ft. Waterleaf sheets prepared from the same pulp gave wet tensile results of 0.8 (unf cured) and 1.2 (cured) lbs./inch width.

The following examples illustrate the use of other quaternizing agents in the preparation of cationic resins of improved stability in accordance with the invention.

EXAMPLES 9–14

Several samples of a polyamide, prepared according to the procedure outlined in Example 1, were each converted to a useful wet-strength resin as follows:

To 116 g. (63 g. dry basis) of the polyamide solution in a round-bottom flask equipped with mechanical stirrer and thermometer was added 240 g. of water. The solution was heated with stirring to 50° C. and 31 g. of epichlorohydrin was added during a period of 2 minutes. The solution was then heated at 70° C. until the viscosity at 25% solids and 25° C. reached about A on the Gardner-Holdt scale. The solution was then cooled to a temperature from about 55° C. to about 65° C., the quaternizing agent added, and heating continued within this temperature range until the viscosity at 25% solids and 25° C. was from about >B to <C on the Gardner-Holdt scale. It was then cooled to 25° C. and adjusted to a pH between about 2.0 and 2.5 with concentrated sulfuric acid. The solids concentrations of the products (listed in the order given in Table 2 below) were 24.5%, 27.0%, 23.5%, 25.2%, 24.3% and 24.7%. In all cases, the products were stable to storage at 25±2° C. for at least 90 days. These resins were evaluated in paper as described in Example 1. The results are listed in Table 2.

*Table 2* [1]

| Ex. No. | Quaternizing Agent—Type | Quaternizing Agent, grams | Percent Resin Added (Dry Pulp Basis) | Wet Tensile (lb./inch width) | |
|---|---|---|---|---|---|
| | | | | Uncured | Cured |
| 9 | Methyl iodide | 20.9 | 1 | 6.0 | 11.5 |
| 10 | Diethyl sulfate | 22.6 | 1 | 5.1 | 10.1 |
| 11 | Ethyl bromide | 16.0 | 1 | 6.1 | 10.6 |
| 12 | 1-chloroglycerol | 16.2 | 1 | 5.5 | 10.0 |
| 13 | 1,3-dichloroglycerol | 19.0 | 1 | 5.4 | 9.5 |
| 14 | Benzyl chloride | 18.6 | 1 | 5.3 | 9.2 |

[1] Basis weight of all sheets was 40.0±0.5 lb. per 3000 sq. ft. Waterleaf sheets prepared from the same pulp gave wet tensile results of 0.8 (uncured) and 1.2 (cured) lbs./inch width.

It will thus be seen that the present invention provides cationic thermosetting polyamide-epichlorohydrin resins of improved stability. While these resins have been shown herein to be particularly useful as wet-strength resins for paper, they have also been found to be useful in many other applications such as insolubilizing agents for water-soluble polymers, aids or assitants in the application of water-soluble and water-insoluble coating, impregating and sizing materials to paper and the like, as bonding agents in the preparation of mineral fiber sheets, mats and the like and in the preparation of nonwoven fabrics, as an agent for preventing shrinkage and felting of wool, as an anchor coat for nonfibrous regenerated cellulose film and so on.

What we claim and desire to protect by Letters Patent is:

1. A process of preparing a water-soluble cationic thermosetting resin of good stability which comprises froming a water-soluble, long-chain polyamide containing secondary amine groups by reacting a $C_3$–$C_{10}$ saturated aliphatic dicarboxylic acid with a polyalkylene polyamine having two primary and at least one secondary amine group linked together by groups of the formula —$C_nH_{2n}$— where $n$ is an integer from 2 to 4 and the number of such groups in the molecule ranges from 2 to 8 at a temperature within the range from about 110° C. to about 250° C., the mole ratio of polyalkylene polyamine to dicarboxylic acid being from about 0.8:1 to about 1.4:1, and then reacting the polyamide in aqueous solution at a temperature within the range from about 45° C. to about 100° C., first partially with epichlorohydrin until at least about 25% of the secondary amine groups in said polyamide have reacted with epichlorohydrin and then with epichlorohydrin and a quaternizing agent capable of quaternizing tertiary nitrogen atoms formed during the reaction and selected from the group consisting of lower alkyl esters of mineral acids, 1,3-dichloropropanol-2,1-chloroglycerol, benzyl chloride and methyl p-toluene sulfonate, the mole ratio of epichlorohydrin to secondary amine groups of said polyamide being from about 0.5:1 to about 1.8:1, and said quarternizing agent being sufficient in amount to convert from about 25% to about 75% of tertiary amine groups formed during the reaction of quaternary groups, continuing the reaction of said polyamide with spichlorohydrin and a quaternizing agent until a water-soluble cationic thermosetting resin is obtained, and terminating the reaction while said cationic thermosetting resin is still water-soluble.

2. A process in accordance with claim 1 wherein the quaternizing agent is dimethyl sulfate.

3. A process in accordance with claim 1 wherein the quaternizing agent is diethyl sulfate.

4. A process in accordance with claim 1 wherein the quaternizing agent is methyl iodide.

5. A process in accordance with claim 1 wherein the quaternizing agent is ethyl bormide.

6. A process in accordance with claim 1 wherein the quaternizing agent is benzyl chloride.

7. The water-soluble cationic thermosetting resin produced in accordance with the process of claim 1.

References Cited by the Examiner
UNITED STATES PATENTS

| | | | |
|---|---|---|---|
| 2,468,086 | 4/1949 | Lantham et al. | 260—78 |
| 2,631,993 | 3/1953 | Morgan | 260—78 |
| 2,882,185 | 4/1959 | Valko et al. | 260—78 |
| 2,926,154 | 2/1960 | Keim | 260—78 |
| 2,961,347 | 11/1960 | Floyd | 260—78 |

WILLIAM H. SHORT, *Primary Examiner.*

J. R. LIEBERMAN, *Examiner.*